United States Patent [19]

Watkins

[11] 4,048,004

[45] Sept. 13, 1977

[54] APPARATUS FOR MOVING A TOOL INTO AND OUT OF ENGAGEMENT WITH A WORKPIECE

[75] Inventor: Joseph Albert Watkins, Rochester, N.Y.

[73] Assignee: Eastman Kodak Company, Rochester, N.Y.

[21] Appl. No.: 671,459

[22] Filed: Mar. 29, 1976

[51] Int. Cl.[2] .................. B32B 31/00; G05G 1/04; B23K 1/06
[52] U.S. Cl. ................... 156/580.1; 74/520; 74/585; 173/166; 228/1 A
[58] Field of Search .......... 156/73.1, 73.2, 73.3, 156/73.4, 580.1, 580.2; 74/585, 520; 228/1; 173/166

[56] References Cited

U.S. PATENT DOCUMENTS

| | | | |
|---|---|---|---|
| 1,542,341 | 6/1925 | Deckert | 74/520 |
| 1,893,216 | 1/1933 | Babitch | 74/520 |
| 2,369,362 | 2/1945 | Marziani | 74/520 |
| 3,222,239 | 12/1965 | Deans | 156/73.4 |
| 3,342,395 | 9/1967 | Diepeveen | 228/1 |
| 3,601,304 | 8/1971 | Mansour | 156/73.1 |

Primary Examiner—Douglas J. Drummond
Attorney, Agent, or Firm—J. A. Matthews

[57] ABSTRACT

Apparatus for moving a tool such as an ultrasonic transducer into and out of engagement with a workpiece comprises actuating means including a piston and a toggle linkage between the piston and the tool. One end of the linkage is coupled to the tool, and the other end engages resilient means which yields after the tool first engages the workpiece and then moves resiliently toward its original position to maintain the tool in contact with the workpiece as yielding occurs.

13 Claims, 11 Drawing Figures

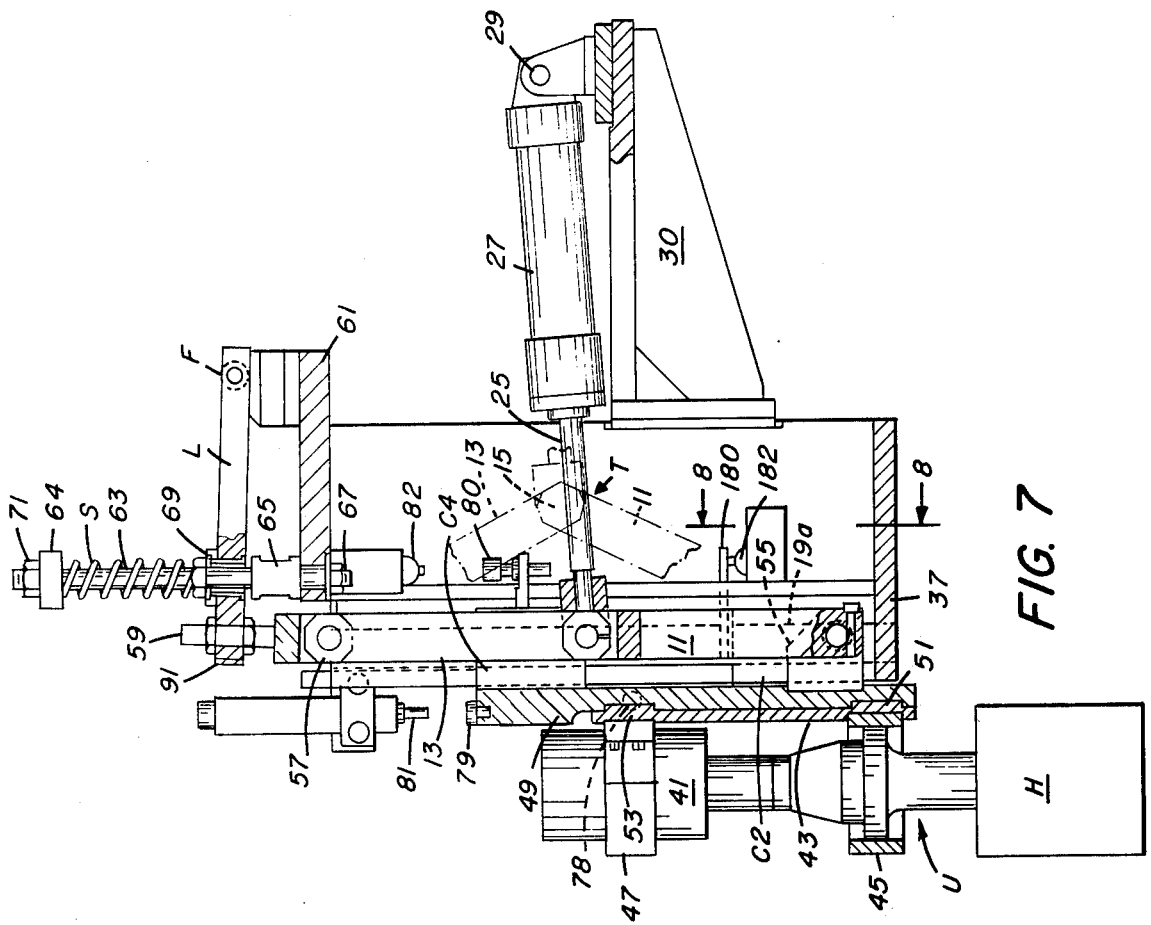
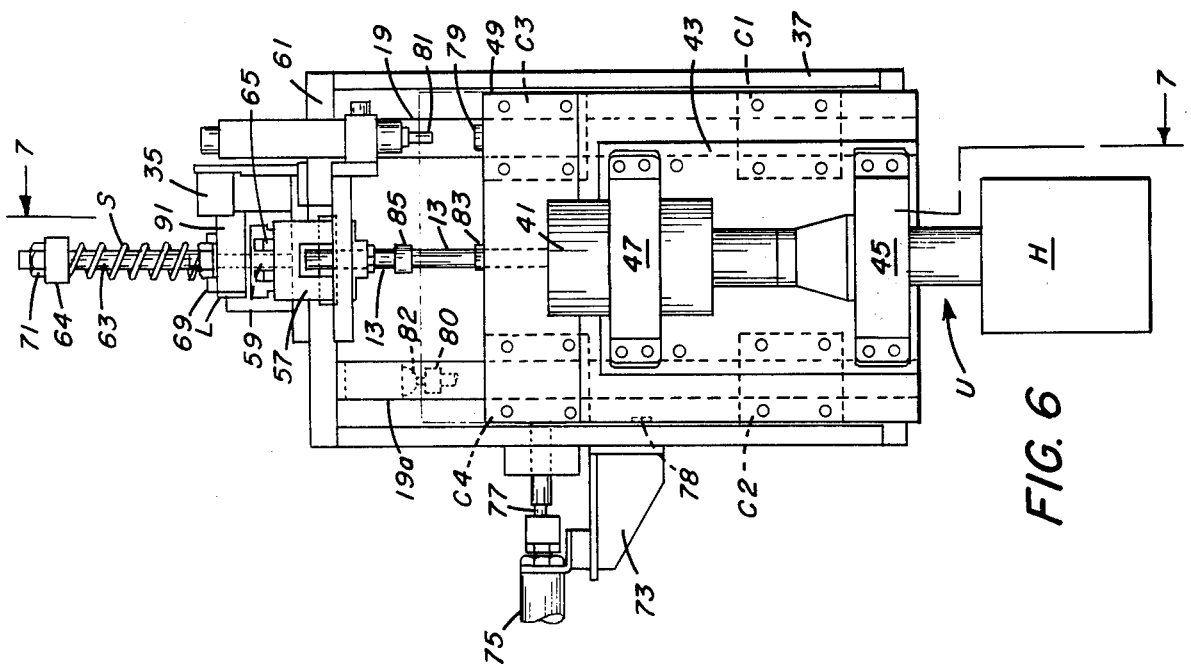

4,048,004

APPARATUS FOR MOVING A TOOL INTO AND OUT OF ENGAGEMENT WITH A WORKPIECE

BACKGROUND OF THE INVENTION

1. Field of the Invention

The present invention relates to novel apparatus for moving a tool such as an ultrasonic transducer for treating an article of manufacture, as by welding parts together, sinking one part into another, rivetting over a plastic member, or boring a hole.

2. The Prior Art

Plastic parts such as film cassettes have been bonded together ultrasonically as described in U.S. Pat. No. 3,224,916. Ultrasonic techniques have also been used for the rivetting of plastic parts as in U.S. Pat. No. 3,367,809, and for sinking metal parts into plastic as in U.S. Pat. No. 3,184,353. Such operations require that an ultrasonic transducer having a horn be moved in one direction into contact with a workpiece where the ultrasonic vibrations, e.g., 20 KHz or more, cause softening or melting to accomplish the desired result. Then the ultrasonic transducer is moved in the opposite direction away from contact with the workpiece.

Movement of the transducer has been accomplished by a piston and cylinder mechanism in which the piston drives the transducer directly into and out of contact with the workpiece. Such a mechanism has been subject to certain disadvantages such as undesirably high impact against the workpiece, cylinder control problems related to acceleration and deceleration, loading of the transducer horn against the workpiece being dependent on cylinder pressure, follow-through of the horn after initial contact with the workpiece being dependent on piston follow-through, and the possibility of triggering ultrasonic power when the horn is unloaded resulting in potential damage to the horn. These disadvantages are most evident with systems using air as the fluid medium; high cycle speeds; large horns using long strokes; and high ultrasonic power.

SUMMARY OF THE INVENTION

In accordance with the present invention I have provided a novel mechanism for moving a tool such as a transducer for generating vibratory energy linearly into and out of engagement with a workpiece which effectively overcomes the disadvantages of the prior art described above. An important feature of such a mechanism is the provision of a toggle joint or linkage imposed between actuating means such as a driving piston and a driven tool such as a vibratory transducer for producing the linear movement of the tool. A spring or other resilient urging means coacts with the toggle joint to accomplish follow-through of the tool as the workpiece yields after initial contact of the tool with the workpiece, for example as a plastic member softens in response to the vibrations of an ultrasonic horn.

More specifically, my apparatus comprises a support for the workpiece to be treated, a tool such as an ultrasonic transducer having a horn, actuating mechanism for moving the tool back and forth along an axis which passes through the workpiece, and coupling means connecting the tool to the actuating mechanism. The actuating mechanism comprises a toggle joint comprising first and second links each having an outer end and a central end, the links being pivotally joined at the central ends to form a knee joint, with the first link having its outer end remote from the knee pivotally connected to the coupling means and thence to the tool. The driving piston operates in a direction transverse to the direction of movement of the transducer. The tool thus is arranged to be out of engagement with the workpiece when the toggle joint is in a retracted position and to engage the workpiece when the toggle joint is in an extended position.

A lever having a movable end and a fulcrum remote from the movable end extends transversely of the axis. The second toggle link has its outer end remote from the knee connected to the lever at a connection point remote from the fulcrum, so that the second link is restrained for movement in substantially the same plane as the plane of movement of the tool.

The connection point of the lever is urged resiliently in a direction about its fulcrum and toward the knee of the toggle joint by a spring or other urging means.

Movement is accomplished by actuating means such as a pressurized fluid-actuated piston mechanism which is coupled to the toggle linkage at the knee joint for moving the knee joint back and forth in a direction transversely of the axis whereby the toggle linkage moves from a retracted folded position to a substantially extended position. Thus the spring and lever together act as resilient means arranged to engage the outer end of the second link whereby when the toggle linkage is in the substantially extended position the tool is urged into engagement with the workpiece while the opposite end of the toggle linkage compresses the resilient means to apply a preloading through the tool to the workpiece.

THE DRAWINGS

FIG. 6 is a front elevational view of a first preferred form of apparatus of the invention;

FIG. 7 is a vertical sectional view, parts being in side elevation, of the apparatus, taken approximately along the line 7—7 in FIG. 6;

THE PREFERRED EMBODIMENTS

Figure 1:
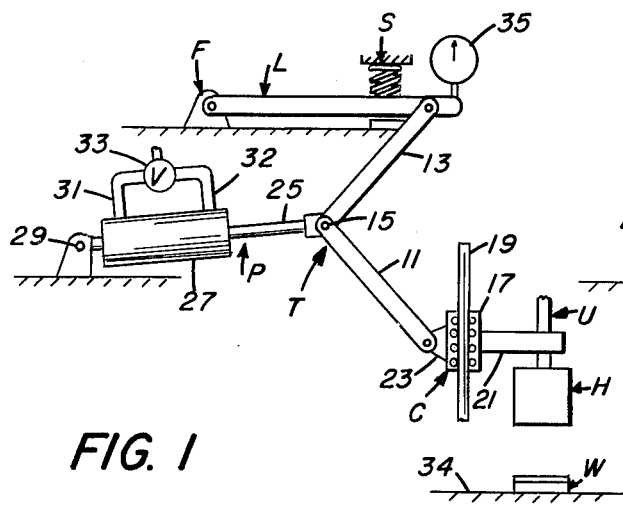
FIGS. 1 to 4 are schematic side elevational views showing successive positions of the apparatus of this invention as an ultrasonic transducer is moved from a rest position into contact with a plastic workpiece such as a cassette having a top piece to be joined to a base.

Referring to FIGS. 1-4, my improved apparatus comprises an ultrasonic transducer U having a horn H, a toggle joint T connected to the transducer by a coupling means C, a generally horizontal lever L having fulcrum F at one end and a coil spring S between its ends, and a piston mechanism P for driving the toggle joint.

Toggle joint T comprises a first link 11 and a second link 13 which are pivotally joined at a knee 15. The opposite end of link 11 is pivotally connected to coupling means C; and the opposite end of link 13 is connected to lever L at a point between spring S and the free end of the lever (although it could also be connected at any other point along the lever spaced from the fulcrum).

Coupling means C comprises a ball bushing 17 which is slidably mounted on a stationary vertical rod 19, a bracket 21 fastened to the transducer, and a bracket 23 pivotally connected to the end of link 11.

Toggle joint T is pivotally connected at knee 15 to an end of a piston rod 25 which is movable back and forth within a cylinder 27 which is pivotally mounted at 29 on a supporting frame for movement in a vertical plane. Pressurized fluid such as air or liquid is introduced selectively into cylinder 27 through supply conduits 31 and 32 controlled by two way valve 33 which admits the fluid to either conduit while the other is connected to exhaust, for moving the piston and rod forward or back, respectively.

Figure 2:
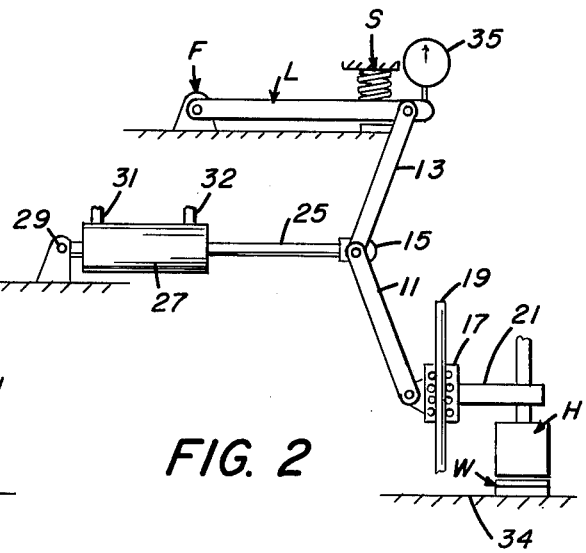

FIGS. 1 to 4 show successive positions of the apparatus when acting on a workpiece W on a support 34 to weld a top piece onto a base and thus form a plastic film cassette. With the apparatus in the position of FIG. 1, pressurized fluid is admitted through conduit 31 to drive piston rod 25 and knee 15 toward the right, causing the angle included between links 11 and 13 to increase from approximately 120° to 180°, and coupler C and horn H to move down toward workpiece W (as shown in FIG. 2), but without moving lever L upwardly against the force of spring S (as shown by the unchanged position of an indicator 35).

Figure 3:
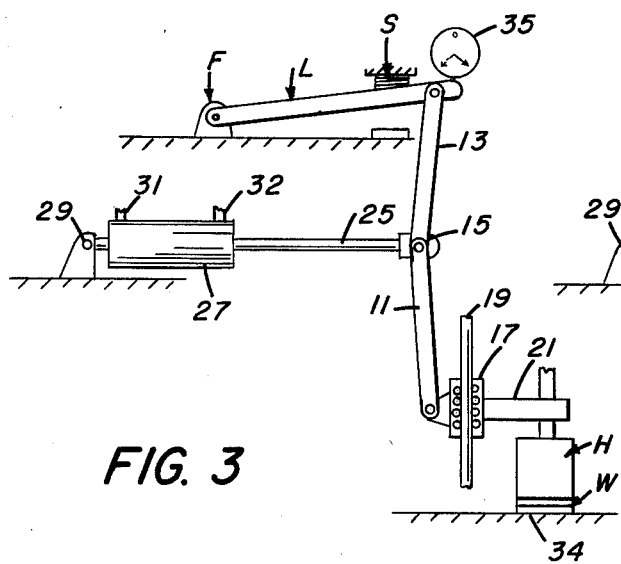
Figure 4:
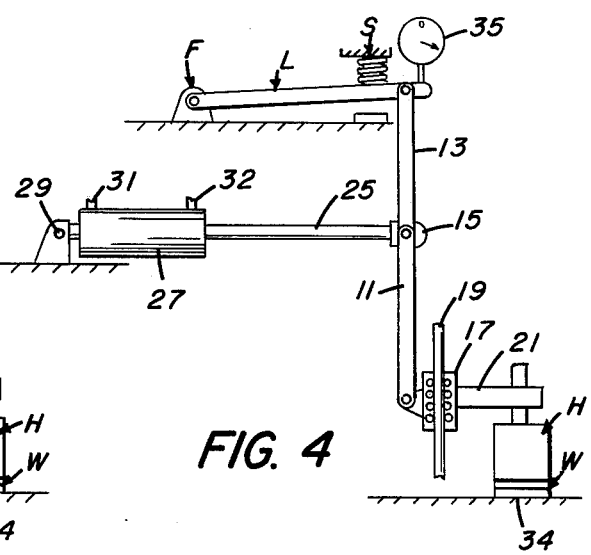

FIG. 3 shows the apparatus just after horn H has contacted workpiece W with links 11 and 13 not yet axially aligned, and with lever L forced upwardly against the force of spring S which causes a spring compression in addition to a predetermined preload, with attendant movement of indicator 35. At a position equal to about one-half the maximum lever movement against spring S the power to the transducer U is manually or automatically triggered and the ultrasonically vibrating horn H causes the plastic of the workpiece W to start to soften and deform. As the plastic softens, links 11 and 13 move to axial alignment (as shown in FIG. 4) and spring S maintains force on lever L downwardly, providing sufficient force to maintain the horn in contact with the workpiece thus to assure that the parts of the workpiece are united, yet without causing undesirably high impact, and without the other disadvantages of the prior art. Undesirably high impact is avoided by keeping the maximum upward motion of lever L against spring S approximately 1% of the length of the links 11 and 13. Also, because of the use of the toggle linkage, the downward movement of the horn H automatically decelerates at the end of the extension of the piston rod without requiring special valving of the cylinder. Indicator 35 again shows the position of spring S and lever L. Indicator 35 can include a switch in a control system for automatically triggering power to the transducer on and off.

After the position shown in FIG. 4 is reached, the power to the transducer is shut off manually or automatically and the contact of horn H with workpiece W is maintained for a predetermined time period, permitting the plastic to cool and resolidify. Then piston rod 25 is moved back to its original position by admitting pressurized fluid through conduit 32 and the apparatus is ready for a repeat operation on the next workpiece.

Figure 5:
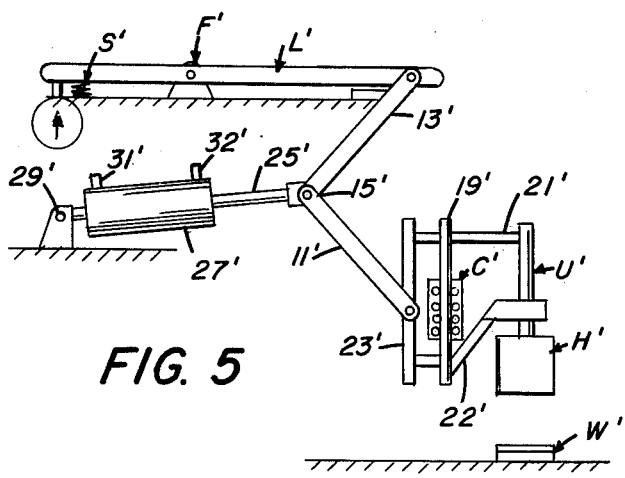
FIG. 5 is a schematic side elevational view of an alternative embodiment of the apparatus, having a modified form of coupling between a transducer and a toggle joint, and a modified lever urging mechanism.

FIG. 5 shows apparatus which functions similarly to that shown in FIGS. 1 to 4 but with two modifications. Lever L' is provided with a fulcrum between its ends at F', and a spring S' is located below lever L' on the opposite side of fulcrum F' from the connection point of link 13'. This requires less headroom for the apparatus than if the spring extended above the lever.

Additionally, the ball bushing C' is stationary and movement of transducer horn H' is accomplished by a rod 19' which moves up and down in the bushing and is connected by brackets 21', 22' and 23' to the transducer and to link 11', respectively.

Figure 8:
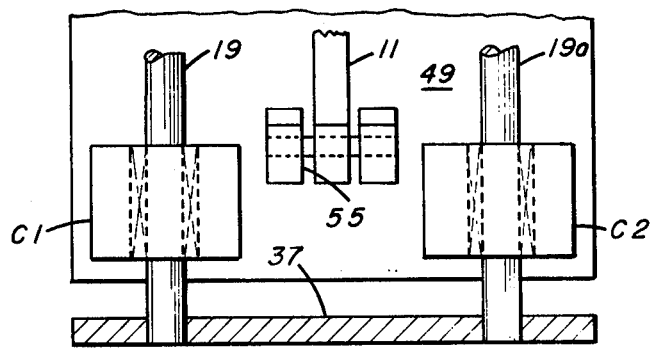
FIG. 8 is an elevational view of a part of the apparatus as seen from the line 8—8 in FIG. 7.

FIGS. 6, 7, and 8 show one preferred embodiment of my apparatus which embodies the structure and principles illustrated schematically in FIGS. 1-4, like reference characters being used to designate like parts.

The apparatus is mounted on a frame 37 which can be supported on a table or other support. An ultrasonic transducer U comprising a horn H connected to a piezoelectric vibration generator 41 is secured on a vertical mounting plate 43 by a pair of bolted clamps 45 and 47. Mounting plate 43 is in turn bolted to a vertical slide plate 49 having two horizonal key ways which receive keys 51 and 53 formed on the inner side of plate 43. Slide plate 49 in turn is welded or bolted to two pairs of laterally and vertically spaced ball bushings C1, C2, and C3, C4 which are mounted on a pair of stationary vertical shafts or rods 19 and 19a on frame 37.

Referring to FIG. 8 bushings C1, C2 and C3, C4 are moved up and down together on shafts 19, 19a by lower toggle link 11 having an end connected to a pivot pin of a clevis 55 which is connected to slide plate 49 by welding or bolting. Link 11, at its opposite end, is coupled by a clevis 15 to piston rod 25, to which the upper second link 13 is similarly coupled. Link 13, at its opposite end, is connected by clevis 57 to a shaft 59 which in turn passes through a free end portion of lever L and is secured thereto by a pair of lock nuts, so that clevis 57 can only move with lever L. The opposite end of lever L has its fulcrum F mounted on a bracket 61 on frame 37. Pivot 29 of cylinder 27 is mounted on an outrigger bracket 30 on support 37. Links 11 and 13 and piston rod 25 are shown in full lines to represent the condition of FIG. 4, and in dash lines to represent the condition of FIG. 1.

Between shaft 59 and fulcrum F a shaft 63 extends from bracket 61 up through an aperture in lever L and carries a spring stop 64 adjacent its upper end. The lower end of shaft 63 is held rigidly on bracket 61 by a shoulder 65 on top of the bracket and a threaded nut 67 below.

A coil spring S surrounds shaft 63 and is captured between spring stop 64 and a bushing 69 on lever L. The degree of preloading by spring compression can be adjusted by raising or lowering threaded spring stop 64 and locking by means of a nut 71 also threaded on the shaft.

The operation of the apparatus of FIGS. 6–8 for moving horn H into and out of contact with a workpiece is as described with reference to FIGS. 1–4, with elements 53 and 49 corresponding to bracket 23, and moving up and down with bushings C1, C2 and C3, C4 on rods 19, 19a.

Certain controls and safety devices are provided in the apparatus of FIGS. 6–8. If the compressed air in the main air line to cylinder 27 were to fail when horn H is in an up position, the horn could drop down suddenly and be damaged. To prevent this, a bracket 73 on one side of frame 37 carries an air cylinder 75 and piston rod 77. Rod 77 is urged toward slide plate 49 by a spring within the cylinder but is normally held away by air pressure in the cylinder which is connected to the same main air supply line as cylinder 27. Thus, if the compressed air to both cylinders should fail, piston rod 77 is driven forward into engagement with a cooperating recess 78 in slide plate 49, which is thus held in an up position.

When the horn H is moved up after completion of its action, undue shock is avoided by having stop 79 on plate 49 contact a shock absorber 81 such as a dash pot to slow the last portion of the return stroke. A final stop occurs when an adjustable rest button 83 contacts stop 85. At this time another movable stop 80 contacts another limit switch 82, stop 80 being carried by a bracket which projects from bushing C4. Switch 82 operates an indicator (not shown) to indicate that the horn is now in the up position.

In order to start or stop the power to transducer U there is provided suitable switch means 35 (FIGS. 6 and 9) which can be actuated by a finger or flag 91 on lever L so as to trigger the power when lever L reaches approximately half the distance to its uppermost position indicating loading of the workpiece as described previously in connection with FIGS. 1–4. This switch means 35 can be of any suitable type such as a mechanical switch or a photocell which is actuated, e.g., by the interruption of a beam of light by finger 91.

Figure 9:
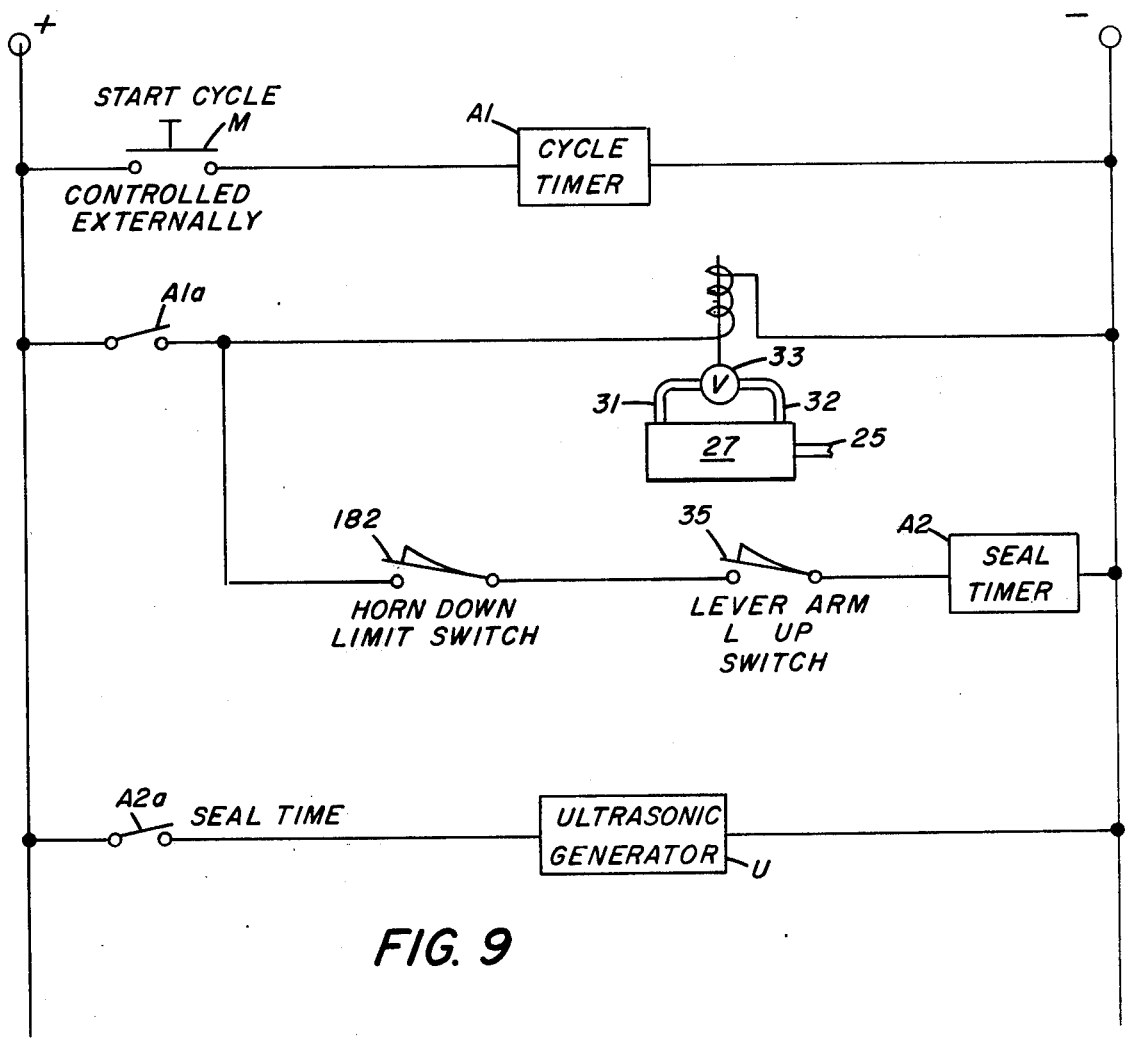
FIG. 9 is a schematic electrical diagram for automatic control of the apparatus of this invention.

FIG. 9 shows a simple automatic control system in which an operator closes a main control switch M to energize a full cycle timer A1 having internal relays. Switch A1a then closes to actuate valve 33 to admit through line 31 into cylinder 27 and move out piston rod 25 to start the downward motion of horn H. As the piston rod approaches its outermost extent of travel and lever arm L reaches its upper position, switch 35 closes; at the same time, the limit switch 182 is closed just before the horn contacts the workpiece, such as a plastic film cassette, thus completing a circuit to a seal timer A2 which contains a relay which closes switch A2a and energizes the transducer U. Such energizing occurs only when spring S has been compressed by link 13. After a short time timer A2 reopens switch A2a while the horn remains in contact with the workpiece until the plastic solidifies. Cycle timer A1 then reopens switch A1a causing valve 33 to admit air through line 32 whereupon piston rod 25 moves inwardly and the horn H begins to rise away from the workpiece, and switches 182 and 35 reopen.

A previously stated advantage of the apparatus of this invention is that ultrasonic power is not switched on until the workpiece is loaded by spring S acting through links 13 and 11, and in turn horn H. In some complex automatic applications, it is possible for the multiple workpieces and/or related machine members to become jammed under horn H. These jams invariably cause the horn to impact upon some surface which is above the plane of the normal workpiece, and naturally the action of lever L and flag 91 will allow ultrasonic power switching. To prevent this undesirable action, interlocking switch 182 and adjustable stop button 180 are employed. Switch 182 is adjusted so as to not allow ultrasonic power to be turned on until horn H is in a position such that one is reasonably guaranteed that the desired workpiece is present without added obstructions. (If no workpiece is present, no switching action will occur because no motion in lever L will occur.)

Figure 11:
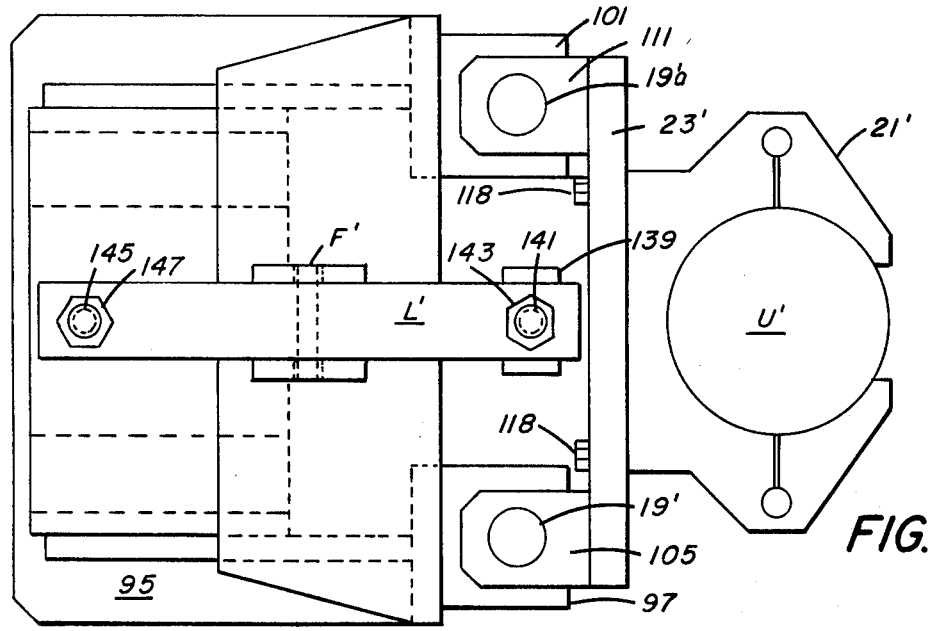
FIG. 11 is a plan view of the apparatus of FIG. 10.
Figure 10:
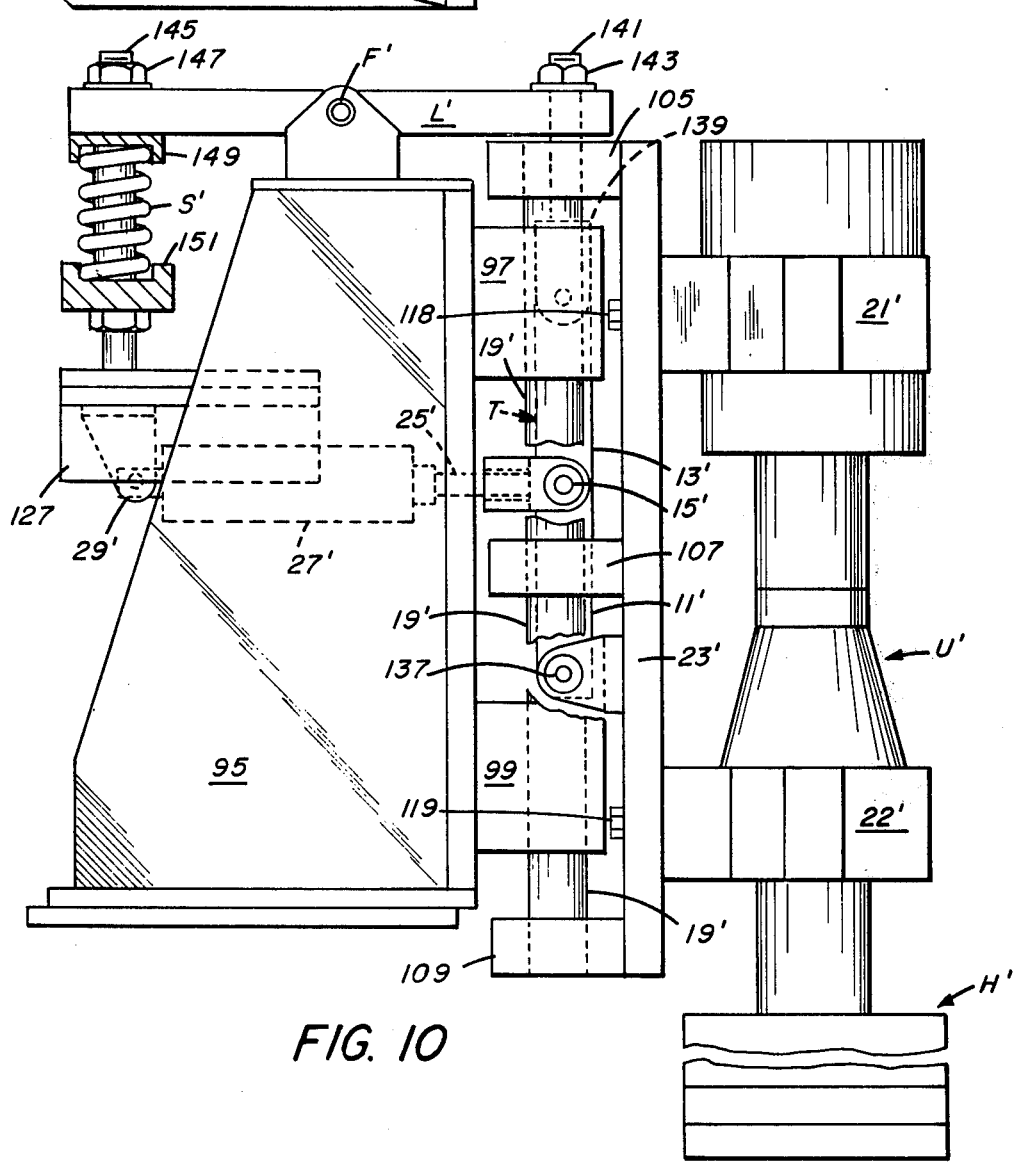
FIG. 10 is a front elevational view of a second preferred form of apparatus of the invention.

Now referring to FIGS. 10 and 11, there is shown an apparatus embodying the structure and principles illustrated schematically in FIG. 5.

A frame 95 is provided with four ball bushings, only three of which 97, 99 and 101 are visible in the drawings. The bushings are arranged in sets as vertically aligned and spaced pairs, e.g., 97 and 99, with the second set spaced horizontally from the first set. The first set of ball bushings, 97 and 99, guide and support a first movable vertical shaft 19' while the second set set guide and support a second movable vertical shaft 19a' parallel to the first shaft. The shafts are vertically movable through the ball bushings and carry a vertical carriage plate 23' via a first set of three vertically spaced brackets 105, 107 and 109, and a second set spaced horizontally from the first set (only the top one 111 being shown.)

Transducer U' is mounted to carriage plate 23' by a pair of clamps 21' and 22' so that the transducer moves up and down as a unit with plate 23' and shafts 19 and 19a'. Bolts 118 hold clamp 21' to plate 23'; and similar bolts 119 hold clamp 22' thereto.

Movement of the transducer up and down is provided by cylinder 27' secured by a pivot 29' at one end to a bracket 127 and having a piston rod 25' protruding from the opposite end connected by a knee or clevis 15' to first ends of links 11' and 13' of a toggle T. The second end of lower link 11' is connected by a clevis 137 to carriage plate 23' for vertically moving it and the associated brackets and shafts.

The upper end of upper link 13' is connected by a clevis 139 to a rod 141 which is threaded up through a bore in one end of lever L'. The rod 141 carries a lock nut 143 on its protruding upper end. Lever L' is connected at fulcrum F' to the frame 95 and projects rearwardly therefrom.

A rod or stud 145 is secured at its lower end to bracket 127 and projects up through a bore adjacent the rear end of lever L' for movement in the bore. A lock nut 147 is threaded over the rod 145 for adjusting the vertical position of lever L'.

A coil spring S' surrounds rod 145 and is captured between an upper retainer 149 and a lower retainer 151 which is threaded on the rod for adjusting the degree of compression of the spring.

The operation of this preferred form of apparatus shown in FIGS. 10 and 11 is as described with reference to FIG. 5. Similar safety features and automatic control features can be employed as described with reference to FIGS. 6–8 but are omitted from the drawings and description for simplicity.

The invention has been described in detail with particular reference to preferred embodiments thereof, but it will be understood that variations and modifications can be effected within the spirit and scope of the invention.

I claim:
1. Apparatus for moving a tool into engagement with a workpiece; said apparatus comprising:
   a toggle linkage including first and second links, each of said first and second links defining a central end and an outer end, and means pivotally connecting said central ends of said first and second links together for movement between folded and straightened conditions, the toggle linkage in the straightened condition defining a longitudinal axis extending through the outer ends of said first and second links;
   drive means for applying a force to said toggle linkage at said connected central ends to move said linkage from the folded condition to the straight- ened position, the straightening force applied by said drive means having essentially no component of force along said longitudinal axis in the straightened condition of said toggle linkage;

means connecting said toggle linkage and the tool for moving the tool into engagement with the workpiece in response to movement of said linkage from the folded condition to the straightened condition, and, resilient means for exerting pressure between the tool and the workpiece in the straightened condition of said toggle linkage, said resilient means applying a force along the longitudinal axis in the straightened condition of the linkage;

whereby the pressure between the tool and the workpiece is essentially entirely the force exerted by said resilient means.

2. Apparatus including a tool and actuating means for moving said tool into engagement with a workpiece; said actuating means comprising: a toggle linkage including first and second links, each of said first and second links having an outer end and a central end, and means pivotally connecting said links together at their central ends to form a knee joint where said linkage is foldable for retracting said tool from the workpiece and straightenable for moving said tool into engagement with the workpiece; drive means connected to said toggle linkage at said knee joint for moving said toggle linkage from the folded position to the straightened position, said drive means in the straightened position of said linkage applying essentially no force longitudinally along said linkage; and resilient means for applying a resilient force longitudinally along said linkage in the straightened position of said linkage, whereby the pressure on the workpiece in the straightened position of the toggle linkage is essentially entirely from said resilient means.

3. The invention according to claim 2 wherein said tool comprises a vibratory transducer and a horn for engaging the workpiece and transmitting vibrations to the workpiece.

4. The invention according to claim 2 wherein said toggle linkage is movable in the extended position of said linkage longitudinally along its length for maintaining pressure between the tool and the workpiece as the tool operates on the workpiece.

5. The invention according to claim 2 wherein said tool is an ultrasonic transducer actuatable to vibrate against the workpiece, and said apparatus includes means for sensing engagement between said tool and the workpiece for actuating said tool only when in engagement with the workpiece.

6. Ultrasonic apparatus for vibrating against a workpiece, said apparatus comprising, in combination, an ultrasonic transducer having a horn for engaging and vibrating against the workpiece; and an actuating mechanism for moving said transducer along an axis into engagement with the workpiece; said actuating mechanism comprising:

a lever having a fulcrum and a movable end remote from said fulcrum pivotable about said fulcrum;

a toggle joint comprising first and second links joined at a knee and movable from a folded condition to a straightened condition for moving said transducer along said axis into engagement with the workpiece, said first link having a part remote from said knee pivotally connected to said transducer and said second link having a part remote from said knee pivotally connected to said movable end of said lever;

means coacting with said lever for resiliently urging said movable end about said fulcrum and toward said knee in the straightened condition of said toggle joint; and straightening means coupled to said knee for moving said toggle joint from the folded condition to the straightened condition, said straightening means applying a force to said knee in a direction transversely of said axis such that said straightening means, in the straightened condition of said toggle joint, applies no more than a minimal force along said axis.

7. Ultrasonic apparatus in accordance with claim 6, wherein said coacting means is a spring engaging said lever between said fulcrum and said second link.

8. Ultrasonic apparatus in accordance with claim 6, wherein said axis is essentially vertical, and wherein said straightening means comprises a cylinder, a piston movable within said cylinder in a direction generally normal to said axis, and a piston rod coupling said piston to said toggle joint at said knee.

9. Ultrasonic apparatus in accordance with claim 6, wherein said axis is essentially vertical; wherein said straightening means comprises a cylinder, a piston movable within said cylinder in a direction transversely of said axis, and a piston rod coupling said piston to said toggle joint at said knee; and wherein said cylinder, at the end thereof remote from said toggle joint is pivotally mounted for movement in an essentially vertical plane.

10. Ultrasonic apparatus in accordance with claim 6, including an electrical system for energizing said transducer; and control means responsive to said lever for energizing said transducer at a predetermined position of movement of said lever about said fulcrum.

11. Ultrasonic apparatus for treating an article, said apparatus comprising, in combination, an ultrasonic transducer having a horn engageable with the article for treating the article;

a lever having a fulcrum and a movable end pivotable about said fulcrum;

a slide plate carrying said transducer;

a plurality of fixed shafts laterally spaced from one another and extending parallel to each other;

a plurality of bushings carried by said slide plate and riding on said shafts;

a toggle joint comprising first and second links joined at a knee and movable from a folded condition to a straightened condition for moving said transducer parallel to said shafts into engagement with the workpiece, said first link having a part remote from said knee pivotally connected to said slide plate and said second link having a part remote from said knee pivotally connected to said movable end of said lever;

means coacting with said lever for resiliently urging said movable end about said fulcrum and toward said knee in the straightened condition of said toggle joint; and means coupled to said knee for straightening said toggle joint, said straightening means applying a force to said knee in a direction generally normal to said axis such that said straightening means applies no more than a minimal force along said axis in the straightened condition of said toggle joint.

12. Ultrasonic apparatus for vibrating against an article, said apparatus comprising; in combination,
an ultrasonic transducer having a horn, said transducer being adapted to move along an axis into and out of contact with said article;
a slide plate carrying said transducer;
a plurality of fixed shafts laterally spaced from one another and extending parallel to said axis;
a plurality of bushings carried by said slide plate and riding on said shafts;
a toggle joint comprising first and second links joined at a knee, said first link having a part remote from said knee pivotally connected to said slide plate;
a lever having a fulcrum between the ends thereof;
said second link having a part remote from said knee connected to said lever at a point remote from said fulcrum toward a first end thereof;
spring means on the same side of said lever as said second link and bearing against said lever at a point remote from said fulcrum toward the opposite second end thereof for resiliently urging said lever about said fulcrum; and means coupled to said toggle joint at said knee for moving said knee back and forth transversely of said axis.

13. Ultrasonic aparatus in accordance with claim 12 also comprising means for adjusting the force exerted by said spring against said lever.

* * * * *

UNITED STATES PATENT AND TRADEMARK OFFICE
CERTIFICATE OF CORRECTION

PATENT NO. : 4,048,004
DATED : September 13, 1977
INVENTOR(S) : Joseph Albert Watkins It is certified that error appears in the above-identified patent and that said Letters Patent are hereby corrected as shown below:

Column 7, line 1, "position" should read --condition--.

Signed and Sealed this

Twenty-first Day of February 1978

[SEAL]

Attest:

RUTH C. MASON
*Attesting Officer*

LUTRELLE F. PARKER
*Acting Commissioner of Patents and Trademarks*